Patented Nov. 18, 1924.

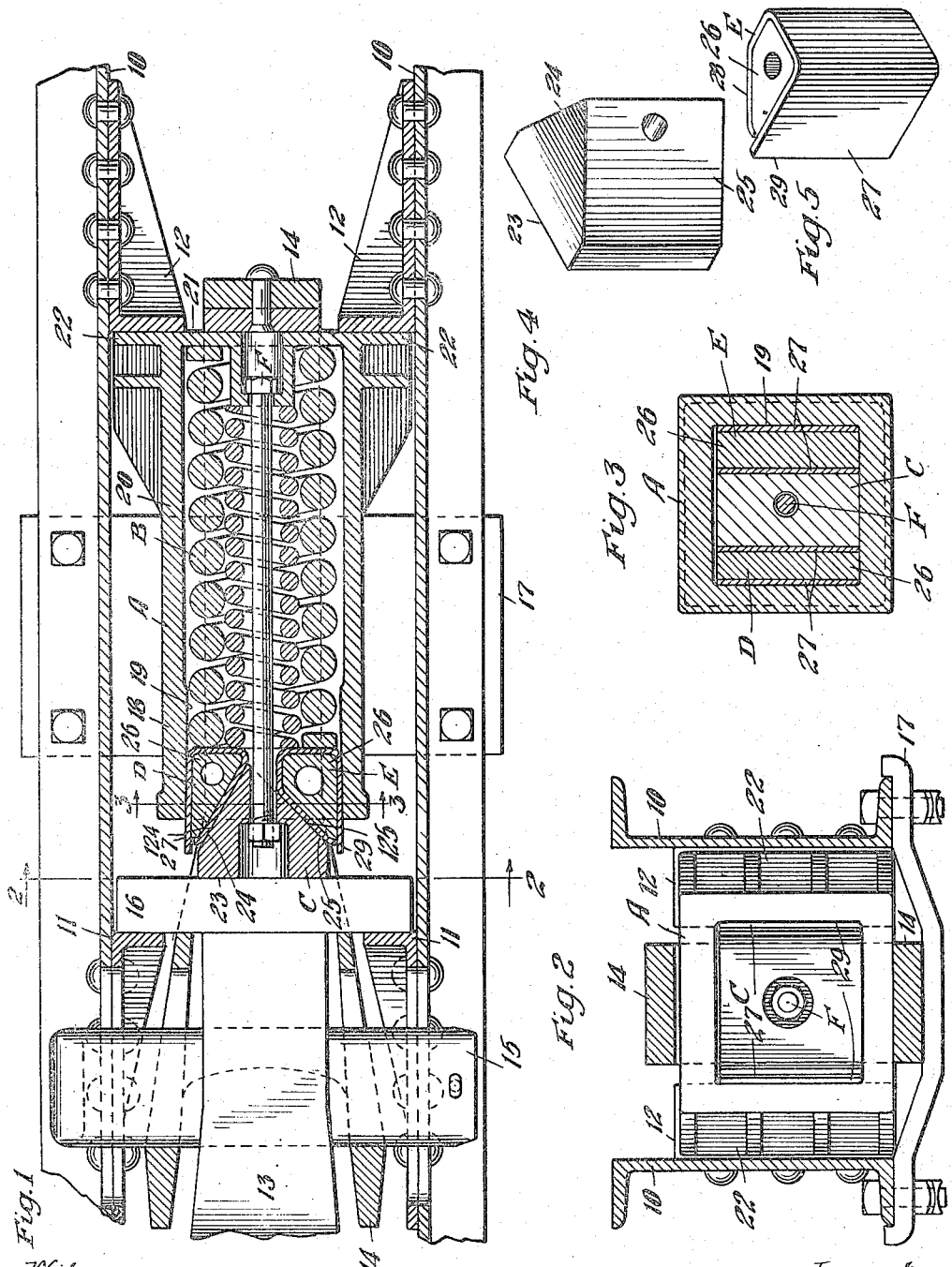

1,515,873

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed December 18, 1920, Serial No. 431,738. Renewed May 16, 1924.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism especially designed for railway draft riggings wherein certain of the friction elements that are subject to the greatest wear are made in a novel and economical manner to most effectively resist wear.

Another object of the invention is to provide a friction shock absorbing mechanism of novel arrangement wherein high capacity is combined with certain release by the employment of a certain arrangement of acute and blunt angled wedging faces.

In the drawing forming a part of this specification, Figure 1 is a longitudinal, horizontal, sectional view of a portion of a railway draft rigging, showing my improvements in connection therewith. Figure 2 is a vertical, transverse, sectional view corresponding substantially to the line 2—2 of Figure 1. Figure 3 is a vertical, sectional view corresponding substantially to the line 3—3 of Figure 1. And Figures 4 and 5 are detail perspectives of the wedge block and one of the friction shoes, respectively.

In said drawing, 10—10 denote channel draft sills of a railway car, to the inner faces of which are secured front stop lugs 11 and rear stop lugs 12. The rear portion of a draw bar is indicated at 13 and the same is operatively associated with the shock absorbing mechanism proper, by means of a hooded cast yoke 14 and a coupler key 15. The shock absorbing mechanism proper and a front follower 16 are mounted within said yoke 14. The yoke and movable parts associated therewith are supported in operative position by a detachable saddle plate 17.

The improved shock absorbing mechanism proper, as shown, comprises, broadly, a combined friction shell and spring cage casting A; a spring resistance B; a wedge or spreader block C; a friction shoe D; a second friction shoe E; and a retainer bolt F.

The casting A is provided with a friction shell 18 at the forward end thereof, said shell being of rectangular form as indicated in Figure 3 and has two opposed friction surfaces 19—19 on the interior thereof. The spring cage portion 20 of the casting A constitutes the rear or inner part of the casting and has an integral rear wall 21 with lateral reinforced extensions 22 adapting the casting to cooperate with the rear stop lugs.

The spring B is or may be of well known form and, as shown, comprises an outer heavy coil and an inner lighter nested coil, the rear ends of the coils bearing upon the rear portions of the casting A and the forward ends of the coils bearing on the inner ends of the shoes D and E. The retainer bolt F is employed in the usual manner and extends centrally of the spring resistance and has a front end thereof in engagement with the wedge block C to hold the parts in assembled relation and to maintain the spring B under an initial compression, if desired.

The wedge block C is formed on the outer side thereof with a flat face 23 adapted to bear against the front follower 16 and receive the pressure applied longitudinally from the drawbar in buff or indirectly from the follower 16 under draft. Said wedge block C is provided on one side thereof with a wedge face 24 which extends at a relatively keen angle with respect to the axis of the mechanism so that said wedge face 24 acts as a true wedging angle when the actuating forces are applied in lines parallel to the axis of the mechanism. On its opposite side, the wedge block C is formed with another inclined flat face 25 which extends at a relative blunt angle with respect to the axis of the mechanism. The angle of the face 25 will vary in accordance with materials employed in the wedge block C and cooperating friction shoe E but will be made so that, with respect to actuating forces applied parallel to the axis of the mechanism, said face 25 will be of a non-wedge-acting character.

The shoes D and E are formed on their outer sides with flat friction surfaces cooperable with the shell friction surfaces 19. On its inner side, the shoe D is formed with a face 124 extending at the same angle as and cooperable with the wedge face 24 of the wedge block C. Similarly, the shoe E is formed with a face 125 cooperable with and extending at the same angle as the face 25 of the wedge block C. In so far as the construction so far described is concerned, and the operation of the mechanism, it is substantially the same as that disclosed in my co-pending application, Serial No. 389,800, filed June 18, 1920, for improvement in friction shock absorbing mechanisms and to which reference is hereby made.

It is highly desirable that the friction shoes have their wearing surfaces composed of material affording a high resistance to frictional wear. It is difficult and expensive to form a shoe possessing such qualities. To accomplish the desired result at a minimum expense, I make each of my friction shoes D and E of two parts. Each consists of an inner or central heavy block or core 26 and an outer wrapped band or plate 27. The inner block or core 26 is of triangular form corresponding to the form of the finished shoe and will preferably be made of malleable iron. It is obvious that such a block can have its surfaces properly trued and will afford the desired strength against crushing and will not be liable to fracture. The outer band 27 will preferably be of hardened spring steel. Each of said plates will be applied to its respective core 26 in the manner shown in Figures 1 and 5 and it will be noted that one end of the plate as indicated at 28 extends along the inclined face of the shoe and the other end 29 of the plate extends along the outer face of the shoe with the end 29 projecting beyond the free edge of the end 28. The plates which are wrapped around the blocks will possess sufficient rigidity as to maintain their bent form and consequently will remain in proper position without the necessity of employing other securing means.

I claim:

1. In a friction shock absorbing mechanism, the combination with a friction shell, spring resistance, and pressure-transmitting wedging means; of friction shoes interposed between said means and the shell, said shoes each comprising a block and a strip of wear-resisting material extending around several sides of the block.

2. As an article of manufacture, a friction shoe for friction shock absorbing mechanisms, said shoe comprising a central main core having a plurality of flat sides, and a strip of wear-resisting material wrapped around several sides of said core.

3. In a friction shock absorbing mechanism, the combination with a friction shell, and spring resistance; of a wedge tapered inwardly of the shell; and friction shoes interposed between said wedge and the shell, each shoe having a face cooperable with one of the faces of the wedge, each of said shoes comprising a central core and a band of hardened material wrapped around the core, one end of said band extending lengthwise of the inclined side of the shoe with the free edge of the band at the outer end of the shoe, the other end of the band extending lengthwise of the outer side of the shoe with the free edge of the band at the outer end of the shoe.

4. As an article of manufacture, a friction shoe for friction shock absorbing mechanisms, said shoe comprising a central main core of triangular cross section, and band of hardened material wrapped around said core, the free ends of said band terminating adjacent one of the edges of the core.

In witness that I claim the foregoing I have hereunto subscribed my name this 30th day of Nov., 1920.

JOHN F. O'CONNOR.

Witness:
   CARRIE GAILING.